(12) United States Patent
Forst et al.

(10) Patent No.: US 9,920,864 B2
(45) Date of Patent: Mar. 20, 2018

(54) CONNECTING DEVICE, AND CORRESPONDING THERMAL EXCHANGER, PARTICULARLY FOR A MOTOR VEHICLE

(71) Applicant: Valeo Vymeniky Tepla k.s., Zebrak (CZ)

(72) Inventors: Jan Forst, Plzen (CZ); Jan Kanok, Prague (CZ); Stanislav Vacek, Pribram (CZ)

(73) Assignee: VALEO VYMENIKY TEPLA k.s., Zebrak (CZ)

( * ) Notice: Subject to any disclaimer, the term of this patent is extended or adjusted under 35 U.S.C. 154(b) by 501 days.

(21) Appl. No.: 14/626,219

(22) Filed: Feb. 19, 2015

(65) Prior Publication Data

US 2015/0233499 A1    Aug. 20, 2015

(30) Foreign Application Priority Data

Feb. 20, 2014    (EP) ..................... 14466007

(51) Int. Cl.
| | |
|---|---|
| *F16L 13/02* | (2006.01) |
| *F16L 13/08* | (2006.01) |
| *F28F 9/26* | (2006.01) |
| *B23K 1/00* | (2006.01) |
| *B23K 101/06* | (2006.01) |
| *B23K 101/14* | (2006.01) |

(52) U.S. Cl.
CPC ............ *F16L 13/08* (2013.01); *B23K 1/0012* (2013.01); *F28F 9/26* (2013.01); *F28F 9/268* (2013.01); *B23K 2201/06* (2013.01); *B23K 2201/14* (2013.01)

(58) Field of Classification Search
CPC .............. B23K 1/0012; B23K 2201/06; B23K 2201/14; F16L 13/08; F28F 9/268
USPC ........ 285/289.1; 228/165, 174, 183, 262.51; 165/76
See application file for complete search history.

(56) References Cited

U.S. PATENT DOCUMENTS

| | | | | |
|---|---|---|---|---|
| 1,810,091 | A * | 6/1931 | Siegle ................. | F16L 13/0209 285/288.1 |
| 5,400,951 | A * | 3/1995 | Shiroyama ........... | B23K 33/004 228/168 |
| 6,199,916 | B1 * | 3/2001 | Klinger ............... | B29C 65/0672 156/73.5 |
| 2013/0319569 | A1 * | 12/2013 | Kikuno ................ | B23K 1/0012 138/109 |

* cited by examiner

*Primary Examiner* — Gregory J Binda
(74) *Attorney, Agent, or Firm* — Howard & Howard Attorneys PLLC

(57) ABSTRACT

The invention relates to a connecting device having a female part and a complementary male part, wherein the female part is a sleeve able to receive at least partially the associated male part with a gap between the sleeve and the male part for receiving a brazing material. The sleeve at least partially has a conical shape. The conical shape has a first substantially conical part having a complementary shape to the male part, with a first inclination angle with respect to a longitudinal axis of the sleeve. The conical shape also has a second substantially conical part with a second inclination angle with respect to the axis, with the second inclination angle being larger than the first inclination angle.

16 Claims, 3 Drawing Sheets

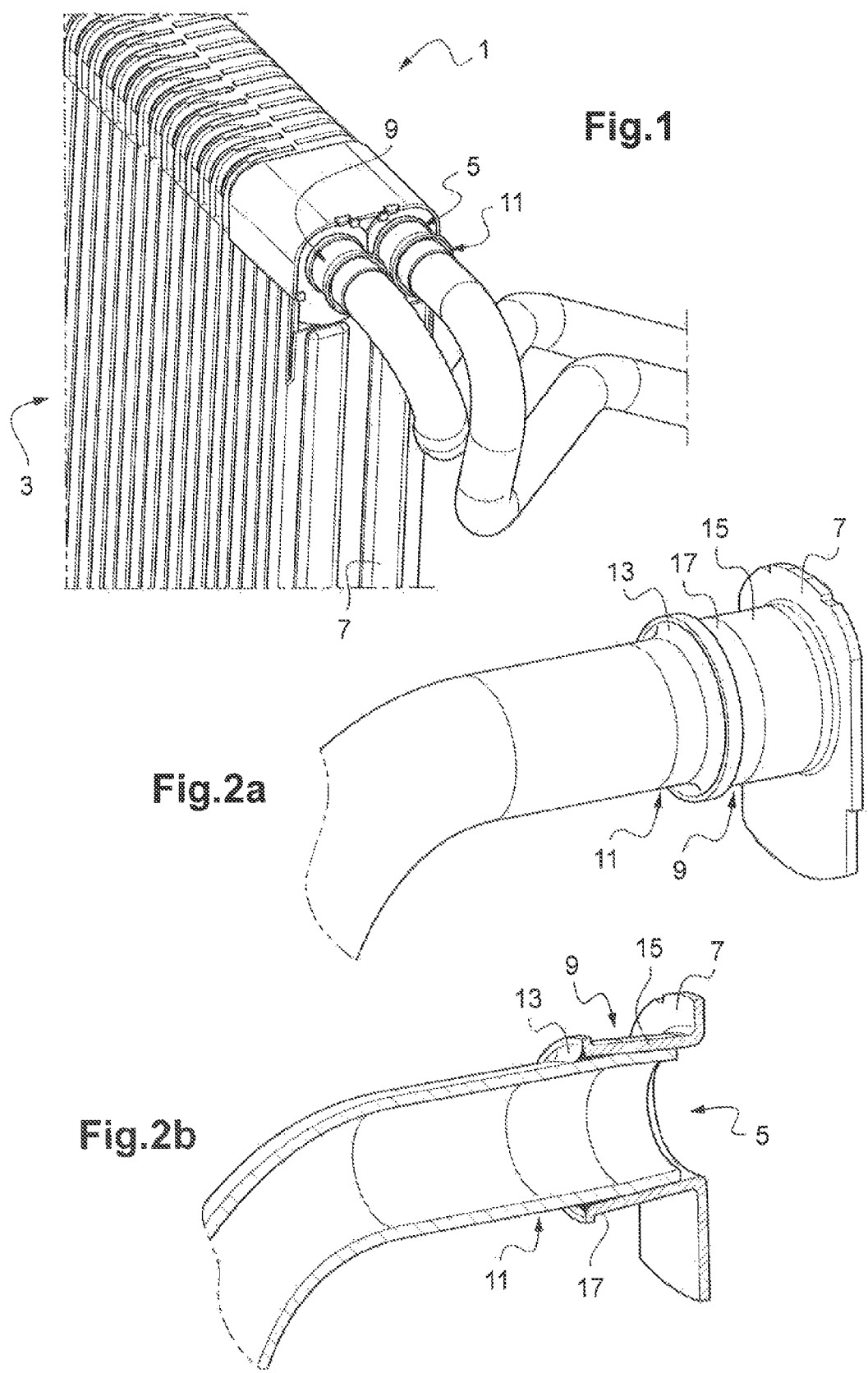

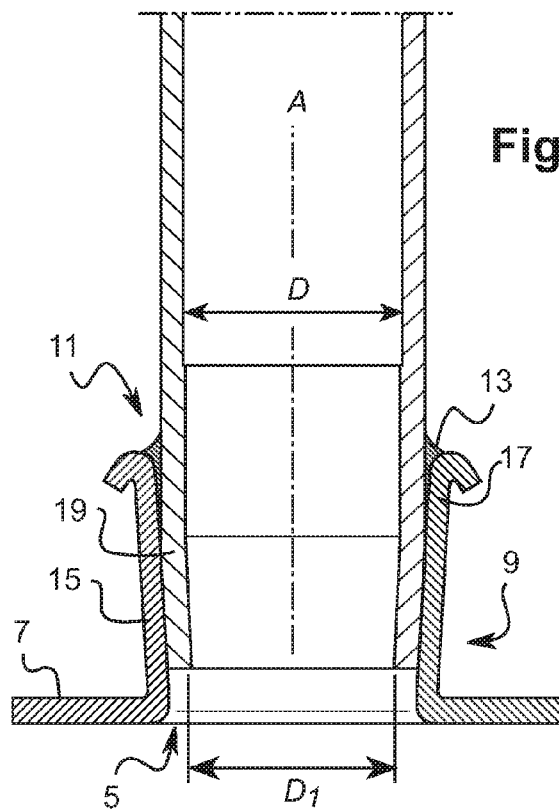
Fig.3
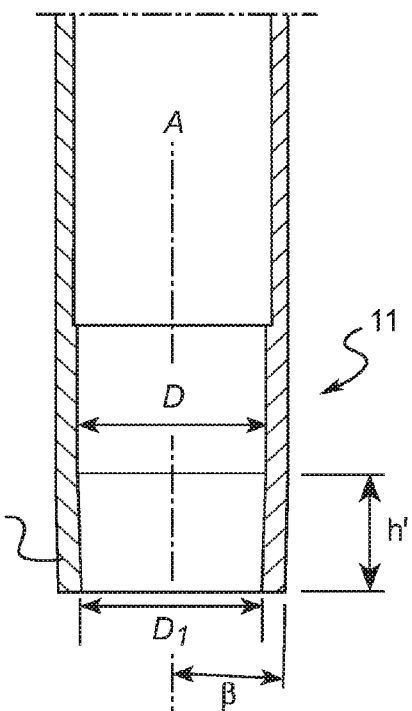
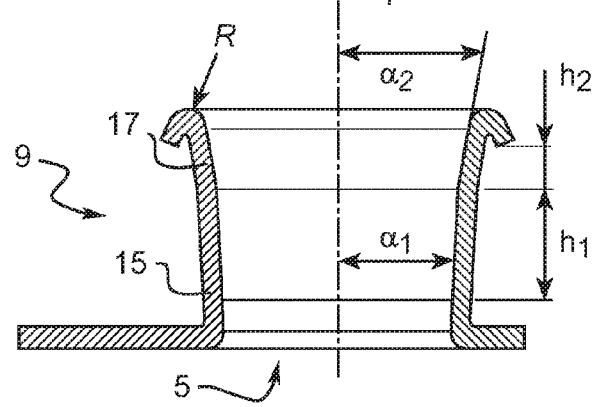
Fig.4

CONNECTING DEVICE, AND CORRESPONDING THERMAL EXCHANGER, PARTICULARLY FOR A MOTOR VEHICLE

RELATED APPLICATIONS

This application claims priority to and all the advantages of European Patent Application No. EP 14466007.3, filed on Feb. 20, 2014.

The present invention relates to a connecting device comprising female and male parts intended to be brazed.

The invention also relates to a thermal exchanger, known as brazed exchanger, including such a connecting device for fluidly connecting the exchanger to a fluid circuit.

The invention applies in particular to a thermal exchanger for motor vehicles.

BACKGROUND

The heat exchangers generally comprise a stack of tubes or plates, for heat exchange, between a first fluid, such as a coolant, circulating in first channels of the stack of tubes or plates, and a second fluid, such as an air flow, for example flowing through second channels of the stack of tubes or plates.

The first channels for the first fluid, such as a coolant, must therefore be supplied with the first fluid.

For that purpose, thermal exchangers may comprise one or more openings fluidly communicating with a connecting device for connection to the first fluid circuit. In a known manner, a female part is realized on a metal component of the exchanger in the form of a sleeve surrounding the opening and is adapted to receive a complementary male part, such as a pipe or a tube, connected to the first fluid circuit.

According to a solution, heat exchangers can include a sleeve that is erected substantially perpendicularly with respect to the plane of the metal cover plate provided with the opening, in order to obtain a sufficient connecting face with the corresponding pipe or tube. Such sleeve is generally substantially cylindrical in the case of an approximately round opening. The corresponding male part is generally provided with a complementary cylindrical shape.

The pipe is inserted into and can later be brazed with the sleeve surrounding the opening. The sleeve and the pipe are generally concentric cylinders.

Further, it is known to introduce a brazing ring in the gap between the cylindrical pipe and sleeve. Then, during brazing, the brazing ring is melted and thus secures the connection.

The length of the gap for receiving the melted brazing material, in the direction of the longitudinal axis of the cylindrical sleeve and complementary pipe, is defined by the overlapping portions of both cylinders. In motor vehicles, a gap with an approximately 2.1 mm length in axial direction is requested by the constructors, for having proper brazing conditions in order to ensure a reliable connection between the sleeve and the complementary pipe of the connecting device.

However, with such a cylindrical connection, it has been noticed that the quality and distribution of the brazing material may not be stable. Indeed, those characteristics depend on the sleeve and pipe tolerances, on their position during the brazing and on tool precision.

Moreover, during brazing the temperature may not be homogeneous what can raises shrinkage cavities in the connecting device.

In order to provide adequate tightness between the male and female parts of the connecting device, according to a known solution, both female and male parts have been provided with complementary conical shapes with the same inclination, one of the male or female part can be pressed onto the inclined connecting surface of the complementary part thus eliminating every air gap between the male and female complementary parts of the connecting device.

However, with such a solution, a predetermined force has to be applied to ensure that the contact between both inclined surfaces is maintained during brazing.

Furthermore, such a configuration does not lead to optimal brazing conditions as required, in particular for motor vehicles, such as stability of a 2.1 mm length gap between both male and female parts, improving the quality and distribution of the brazing material, while ensuring temperature homogeneity during brazing.

SUMMARY OF THE INVENTION

It is an object of the invention to simplify the brazed connection between the female and male parts of such a connecting device, for example provided on a thermal exchanger for a motor vehicle, while ensuring optimized brazing conditions for securing a tight connection.

The invention thus relates to a connecting device having a female part and a complementary male part, wherein the female part is realized as a sleeve able to receive at least partially the associated male part with a gap between the sleeve and the male part for receiving a brazing material, characterized in that said sleeve is designed at least partially with a conical shape comprising:
  a first substantially conical part having a complementary shape to the male part, with a first inclination angle with respect to a longitudinal axis of the sleeve, and
  a second substantially conical part with a second inclination angle with respect to said axis, the second inclination angle being larger than the first inclination angle.

According to a preferred embodiment, the male part comprises a substantially conical part with an inclination angle substantially equal to the first inclination angle of the first conical part of the sleeve.

The brazing material according to the invention is arranged in the area of the axial direction of the gap created when an end of the female part, formed as a coupling sleeve, and an end of the complementary male part are joined. The gap extends annularly around the circumference of the end of the complementary male part, such as a pipe, received in the sleeve.

The first conical part of the sleeve is chosen to prepare an optimized gap between the second conical part of the sleeve and the complementary male part for improving the distribution of the melted brazing material during brazing.

Compare to a cylinder connection, the contact square surface is increased, what improves the connection between both female and male parts of the connecting device.

Moreover, this double cone configuration improves the temperature homogeneity of the connection during brazing.

The male part can be designed as a pipe.

According to an embodiment, the first angle is approximately 2°, and the second angle is approximately 4°.

The lateral dimension of the gap for the brazing material, with respect to said axis, can reach approximately up to 0.2 mm.

The first 2° angle is selected in order to stop the pipe in the sleeve and to improve the concentricity of the pipe and the sleeve.

The second 4° angle is selected in order to create the longest lateral gap from 0 mm to 0.2 mm around the circumference of the end of the complementary pipe received in the sleeve.

According to an aspect of the invention, the first conical part of the sleeve extends along a first height and the corresponding conical part of the male part extends along a height substantially equal to the first height.

The first height can be approximately 6 mm.

The first conical part with a first angle, for example 2° angle, conformed for the contact between the sleeve and the complementary pipe on the first height, such as 6 mm height, contributes to improve the temperature homogeneity of the brazed connection during brazing as it reduces the risk of shrinkage cavities formation.

According to a second aspect of the invention, the second conical part of the sleeve extends along a second height, the second height defining an axial distance of the gap in the direction of said axis. The second height is for example approximately 3 mm.

The 3 mm high gap matches with the 2.1 mm minimum for the brazing length conformity as requested for motor vehicles thermal exchangers.

According to an embodiment, the internal wall of the sleeve is designed at least partially with a conical shape.

The external wall of the sleeve can be designed at least partially with a cylindrical shape or conical shape.

The invention relates mainly to the internal shape of the sleeve.

The external shape is linked to the production process of the sleeve and linked to the design requested.

The top of the sleeve can comprise a chamfer, the chamfer angle being for instance approximately 45° with respect to said axis. This chamfer or radius improves the concentration of the melted ring flowing into the gap during brazing.

The top of the sleeve can have a third height substantially equal to the thickness of the sleeve, for example approximately 1 mm. The third height for bending the top of the sleeve depends on the sleeve thickness.

The invention also relates to a thermal exchanger between at least a first fluid and a second fluid, in particular for a motor vehicle, comprising at least one metal component with at least one opening for the flowing of the first fluid, characterized in that said exchanger further comprises at least one connecting device according to anyone of the preceding claims for connecting said opening to a circuit of the first fluid.

Such a connecting device as defined above allows to get optimized brazing conditions for a brazed thermal exchanger, such as an approximately 3 mm axial distance of the gap for receiving the brazing material between the sleeve and the complementary pipe, for guaranteeing quality and distribution stability of the brazing material while ensuring temperature homogeneity during brazing.

According to an embodiment, at least one of the female part or male part of the connecting device is integrally formed with the metal component.

According to a preferred embodiment, the metal component of said exchanger comprises at least one sleeve surrounding an associated opening and able to receive at least partially an associated male part configured to be connected to the circuit of the first fluid, with a gap between the sleeve and the male part for receiving a brazing material.

The conical shape of the sleeve can be directed towards the outside of the exchanger.

The metal component can include a cover plate of the exchanger, and said axis can be substantially perpendicular to the plane defined by the cover plate.

BRIEF DESCRIPTION OF DRAWING

Other characteristics and advantages of the invention will emerge more clearly on reading the following description, which is given as a non-limiting illustrative example, and the attached drawings, among which:

FIG. 1 is a perspective view of a thermal exchanger comprising a connecting device according to the invention, FIG. 2a shows in a perspective view a part of the thermal exchanger which has a female part of the connecting device realized as a sleeve and brazed with a complementary male part realized as a pipe for connection to a fluid circuit, FIG. 2b is a cross-section view of FIG. 2a, FIG. 3 is a second cross-section view through the sleeve of the thermal exchanger brazed with the pipe, with a different orientation from FIG. 2b, FIG. 4 is an exploded cross-section view of the pipe and the sleeve of the connecting device before brazing.

DETAILED DESCRIPTION

Figure 5:
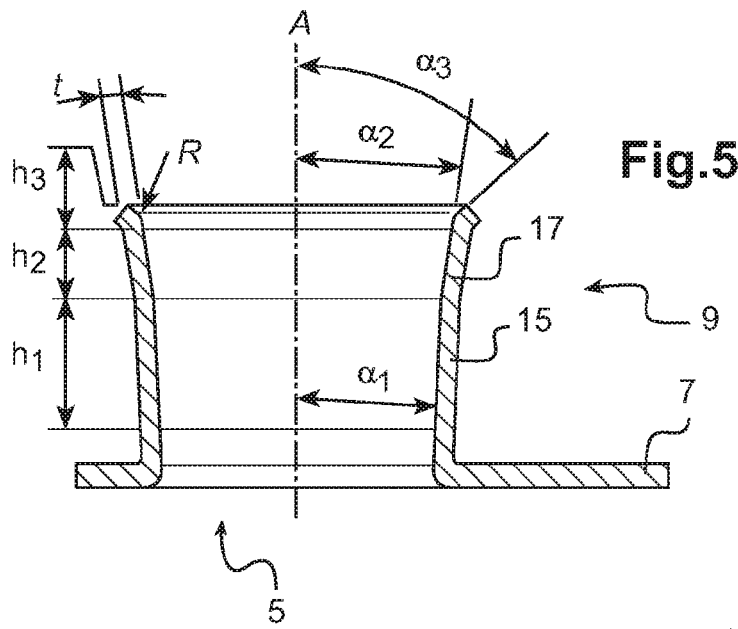
FIG. 5 is a cross-section view of the sleeve of the connecting device intended to be brazed with the complementary pipe.

In those drawings, identical reference numbers are used to designate the same elements, without repeating the explanation.

The invention relates to a thermal exchanger 1 partially drawn in FIG. 1, more precisely a heat exchanger 1, between a first fluid and a second fluid.

The exchanger 1 may comprise a stack 3 of plates or tubes, defining first channels of circulation for the first fluid and second channels of circulation for the second fluid. As a non-limiting example, the first fluid may be a coolant intended to circulate inside the first channels of the exchanger 1. The second fluid may be an air flow passing through the exchanger e.g. transversely to the stack 3 of plates or tubes.

The plates or tubes of the stack 3 are preferably metallic, for example in aluminium.

In addition, the exchanger 1 comprises at least one opening 5 for the flowing of the first fluid. In this example the exchanger 1 comprises two openings 5: a fluid inlet opening and a fluid outlet opening, respectively for admitting the first fluid into the first channels of the exchanger 1 and for passing the first fluid out of the exchanger 1 after having circulated in the first channels. The one or more openings 5 are thus intended to fluidly communicate with a circuit of the first fluid.

The one or more openings 5 may be substantially circular holes.

The openings 5 are provided on a metal component of the exchanger 1, such as a cover plate 7. The metal component may comprise aluminium.

The exchanger 1 further comprises a connecting device having complementary parts including a female part, which may be a sleeve 9, and a male part 11, for connection to a circuit of the first fluid.

According to the embodiment illustrated in FIGS. 2a and 2b, the female part is realized as a sleeve 9. The complementary male part 11 is for example realized as a pipe 11.

The sleeve 9 is adapted to be brazed with the complementary pipe 11, detailed later. To this end, the complementary pipe 11 is intended to be received in the sleeve 9 with a gap between the internal wall of the sleeve 9 and the external wall of the complementary pipe 11 for receiving a brazing material 13 as more visible in FIGS. 2a and 3.

The exchanger 1 comprises for example the female part of the connecting device, formed as a sleeve 9 and which surrounds one opening 5, in order to allow the fluidic communication between the exchanger 1 and a circuit of the first fluid.

The sleeve 9 may be integrally formed with the cover plate 7.

Referring back to FIG. 1, the sleeve 9 extends opposite to the stack 3 of plates or tubes of the exchanger 1, thus towards the outside of the exchanger 1.

The sleeve 9 is designed at least partially with a conical shape. More precisely, the sleeve 9 is designed at least partially with an internal conical shape.

According to the illustrated embodiment in FIGS. 3 to 5, the sleeve 9 is also designed with an external conical shape. Alternatively, the external shape of the sleeve may be for example substantially cylindrical.

Moreover, according to the illustrated embodiment, at least the free end portion of the sleeve 9, which is opposite to the cover plate 7 when provided on the exchanger 1, is designed with an internal wall substantially conical, and in this example with the external wall also substantially conical. The cone-shaped part of the sleeve 9 thus forms a flared sleeve part which is directed towards the outside of the exchanger 1 in the manner of a flange when the connecting device is provided on such an exchanger 1.

The base of the sleeve 9, which is for example linked to the cover plate 7 of the exchanger 1, may be substantially cylindrical.

Furthermore, the sleeve 9 at least partially cone-shaped has a maximum opening at the top of the sleeve 9. Moreover, the inclination of the cone-shaped part of the sleeve 9 is directed outward.

Referring to FIG. 4, the sleeve 9 is provided with at least two conical parts 15, 17 with different angles of inclination.

Indeed, a first conical part 15 of the sleeve 9 has a first inclination with a first angle $\alpha_1$, also named first inclination angle, and the second conical part 17 has a second inclination with a second angle $\alpha_2$, also named second inclination angle.

The first conical part 15 of the sleeve 9 is closer to the cover plate 7 than the second conical part 17 when provided on the exchanger 1.

The first angle $\alpha_1$ is for example approximately 2° with respect to a longitudinal axis A of the sleeve 9.

The axis A is in the illustrated embodiment substantially perpendicular to the plane defined by the cover plate 7.

The value of approximately 2° for the first angle $\alpha_1$ is selected to ensure a brazing stability of the complementary male part 11 with the sleeve 9. This 2° value for the first angle $\alpha_1$ is optimized for the stability. Indeed, a smaller angle than 2° is quite not suitable due to process production tolerances, and a higher angle than 2° does not fit for ensuring the requested stability of the complementary male part 11, such as a pipe 11 in the sleeve 9.

The second angle $\alpha_2$ is larger than the first angle $\alpha_1$. The second angle $\alpha_2$ is for example approximately 4° with respect to the axis A. This value of approximately 4° for the second angle $\alpha_2$ defines a lateral gap between the complementary pipe 11 and the sleeve 9 that can reach up to 0.2 mm. A smaller value than 4° may be quite inappropriate due to process tolerances. A higher value than 4° defines a shorter lateral gap.

The first conical part 15 of the sleeve 9 may extend along a first height $h_1$. The second conical part 17 may extend along a second height $h_2$. The first height $h_1$ may be approximately 6 mm. The second height $h_2$ may be approximately 3 mm.

The first conical part 15 of the sleeve 9 is designed so that a corresponding portion of the complementary pipe 11 bears against the first conical part 15, when the sleeve 9 receives the complementary pipe 11.

The second height $h_2$ thus defines an axial distance, in the direction of the axis A, for the gap between the sleeve 9 and the complementary pipe 11 for receiving the brazing material 13. Such axial gap of approximately 3 mm ensures a minimum distance for the brazing conformity which is 2.1 mm for a motor vehicle thermal exchanger 1, with a certain margin for the brazing process.

As more visible in FIG. 5, the top end of the sleeve 9 may further be bent on a third height $h_3$, thus forming a chamfer R defining a third angle $\alpha_3$ with respect to the axis A.

The third height $h_3$ may be approximately 1 mm. The third height $h_3$ may be chosen substantially equal to the thickness t of the sleeve 9, which may be for example around 1 mm±0.1 mm.

The third angle $\alpha_3$ is chosen so as to improve the concentration of the brazing material into the gap. The third angle $\alpha_3$ may be approximately 45°.

In the described embodiment, the total height of the conical shape of the sleeve 9 may be as an example 10 mm. Thus, the three heights $h_1$, $h_2$ and $h_3$ are chosen to reach this total height of 10 mm. The combination of a first height $h_1$ of 6 mm and a first angle $\alpha_1$ of 2° for the first conical part 15, a second height $h_2$ of 3 mm and a second angle $\alpha_2$ of 4° for the second conical part 17, and a third height $h_3$ for the bent top of the sleeve 9 allows to obtain the required brazing quality and stability.

Furthermore, with the double cone sleeve 9 according to the invention, the contact square surface is increased compared to a cylinder connection, particularly compared to a cylindrical sleeve with the same 10 mm total length, the contact square surface with the double cone sleeve of the invention is nearly seven times higher.

As said before, the connecting device further comprises a male part 11, for example realized as a pipe, connected and brazed with the sleeve 9 for making one associated opening 5 to fluidly communicate with a (non illustrated) circuit or line of the first fluid when the connecting device is provided on the exchanger 1.

In the illustrated embodiment, the pipe 11 is able to be at least partially received into the sleeve 9 and to be fixed, more precisely brazed with the sleeve 9, in order to connect the exchanger 1 for example with a feed or discharging line, for the first fluid such as a coolant. The pipe 11 has an end portion forming a connecting portion intended to be received into the associated sleeve 9 and brazed with this associated sleeve 9.

The pipe 11 has a complementary shape to the corresponding sleeve 9, at least on the end portion of the pipe 11 intended to be inserted into the sleeve 9. More precisely, the end portion of the pipe 11 is at least partially cone-shaped, the conical shape being complementary to the conical shape of the sleeve 9 along the first height $h_1$, meaning to the first conical part 15 of the sleeve 9.

According to the embodiment illustrated in FIGS. 2b and 3, the end portion of the pipe 11 has a conical part 19 designed to fully bear against the internal wall of the first conical part 15 of the sleeve 9, when the pipe 11 is received in the sleeve 9.

For that purpose, as illustrated in FIG. 4, the conical part 19 of the pipe 11 extends at least on a height h' substantially equal to the first height $h_1$ of the first conical part 15 of the sleeve 9, and the inclination of the conical part 19 of the pipe 11 defines an angle β with respect to the axis A, substantially equal to the first angle $α_1$ of the first conical part 15 of the sleeve 9, here approximately 2°.

The rest of the pipe 11 may be substantially cylindrical.

The conical part 19 of the pipe 11 and the first conical part 15 of the sleeve 9 are concentric cones.

The choice of an angle of approximately 2° and a height $h_1$ or h' of approximately 6 mm for the first conical part 15 of the sleeve 9 and for the conical part 19 of the pipe 11 secures the concentricity of the sleeve 9 and the pipe 11.

More precisely, the angle $α_1$, β for the first conical part 15 of the sleeve 9 and for the conical part 19 of the pipe 11, is chosen in order to stop the end portion of the pipe 11 in the sleeve 9 and to ensure the concentricity of the pipe 11 and the sleeve 9. The selection of approximately 2° for the angles $α_1$, β ensures the brazing stability of the pipe 11 into the sleeve 9. Particularly, an angle smaller than 2° is quite not appropriate due to process production tolerances, and an angle higher than 2° cannot allow such a stability of the pipe 11 brazed with the sleeve 9.

In summary, the first inclination of the first conical part 15 of the sleeve 9 and of the conical part 19 of the pipe 11 affects the gap between the second conical part 17 of the sleeve 9 and the pipe 11, for improving the distribution of the melted brazing material 13 for securely fixing together the pipe 11 and the sleeve 9.

Further, as schematically shown in FIGS. 3 and 4, the nominal diameter D of the cylindrical part of the pipe 11, may be approximately 12.5 mm and higher, for example up to approximately 15.9 mm. In case of a nominal diameter D of approximately 12.5 mm, at the smallest end of the 2° conical part 19 of the pipe 11 of 6 mm high, the diameter $D_1$ may be approximately 12.1 mm.

The height $h_1$, h' of approximately 6 mm for the first conical part 15 of the sleeve 9 and for the conical part 19 of the pipe 11 is selected for such nominal diameter D of the pipe 11 from approximately 12.5 mm to 15.9 mm.

Alternatively, for a pipe 11 having a conical part 19 with a smaller nominal diameter D, such as 9.5 mm, the height $h_1$, h' is selected to be approximately 4.5 mm.

Figure 6:
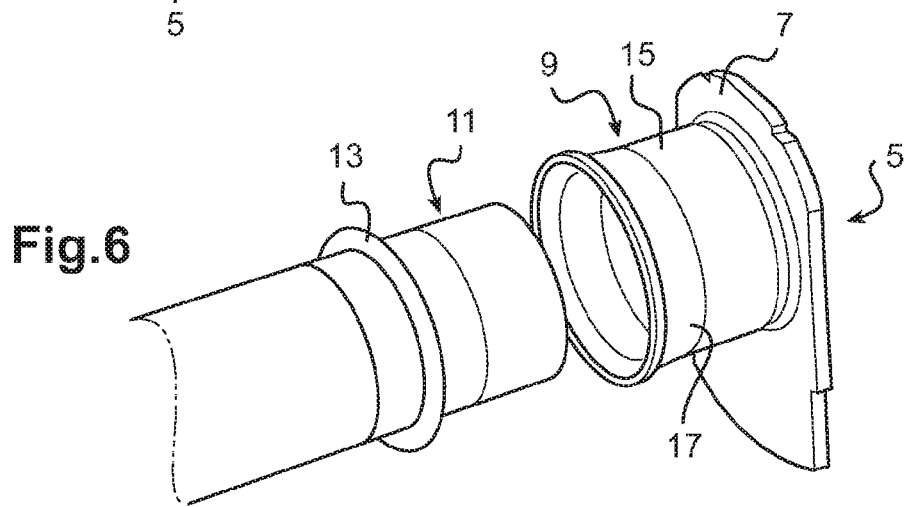
FIG. 6 is an exploded view of the pipe with a brazing ring, and the sleeve of the connecting device before brazing.
Figure 7:
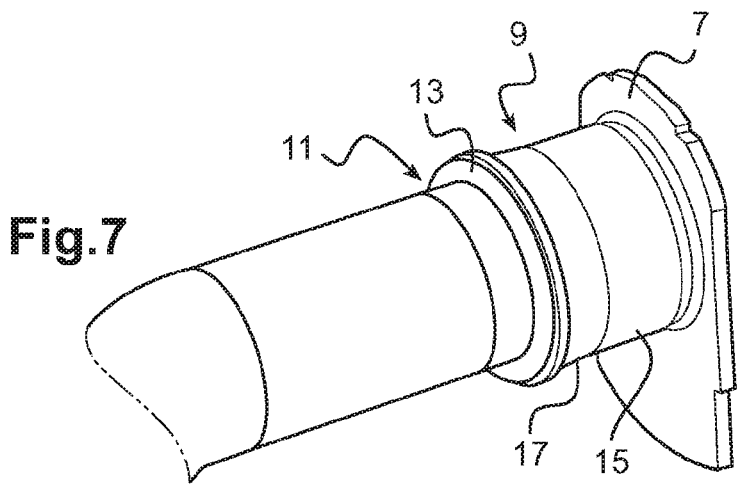
FIG. 7 is a perspective view of the pipe with a brazing ring, and the sleeve of the connecting device assembled together before brazing.

Referring now to FIGS. 6 and 7, the brazing material 13, for example in the form of a brazing ring, is mounted around the pipe 11 (FIG. 6) so as to be disposed in the lateral gap between the pipe 11 and the second conical part 17 of the sleeve 9, when the pipe 11 is received within the sleeve 9 (FIG. 7).

The brazing ring 13 can be mounted beforehand on the pipe 11 and then in the gap when inserting the pipe 11 into the sleeve 9. Alternatively, the brazing ring 13 can be inserted in the gap after joining the pipe 11 and the sleeve 9.

The pipe 11 and the sleeve 9 pre-assembled in this manner may then be securely connected through the brazing material 13 during the brazing process. Optionally, a support tool may be used before the brazing process to keep the pipe 11 in the sleeve 9 and secure the correct position of the pipe 11.

During the brazing process, the brazing material 13 is melted (FIGS. 2a to 3), then flows into and fills the gap between the second conical part 17 of the sleeve 9 and the pipe 11, along the height $h_2$ for example of approximately 3 mm. This creates a tight mechanical resistance connection between the pipe 11 and the receiving sleeve 9.

Of course, the brazing material 13 can may or may not completely fill the entire gap in the axial direction.

Thus, the sleeve 9 with two conical parts of different inclination angles and the corresponding pipe 11 with a conical part of a complementary shape of the first conical part 15 of the sleeve 9, lead to obtain optimized dimensions of the gap for receiving the melted brazing material. Once brazed, the connection between the sleeve 9 and the pipe 11 is a tight mechanical resistance connection.

The invention claimed is:

1. A connecting device having a female part and a complementary male part, wherein the female part is a sleeve able to receive at least partially the male part with a gap defined between the sleeve and the male part for receiving a brazing material, wherein the sleeve is designed at least partially with a conical shape comprising:
    a first substantially conical part having a complementary shape to the male part, with a first inclination angle with respect to a longitudinal axis of the sleeve, and
    a second substantially conical part with a second inclination angle with respect to the axis, with the second inclination angle greater than the first inclination angle, wherein the first angle is approximately 2°, and the second angle is approximately 4°.

2. The connecting device according to claim 1, wherein the male part comprises a substantially conical part with an inclination angle substantially equal to the first inclination angle of the first conical part of the sleeve.

3. The connecting device according to claim 2, wherein the first conical part of the sleeve extends along a first height and the corresponding conical part of the male part extends along a height substantially equal to the first height of the first conical part.

4. The connecting device according to claim 1, wherein the male part is a pipe.

5. The connecting device according to claim 1, wherein a lateral dimension of the gap for the brazing material, with respect to the axis, reaches approximately up to 0.2 mm.

6. The connecting device according to claim 3, wherein the first height is approximately 6 mm.

7. The connecting device according to claim 3, wherein the second conical part of the sleeve extends along a second height defining an axial distance of the gap in the direction of the axis, wherein the second height is approximately 3 mm.

8. The connecting device according to claim 7, wherein the top of the sleeve has a third height substantially equal to a thickness of the sleeve, of approximately 1 mm, wherein the third height is added to the first height and the second height to equal a total height of the conical shape of the sleeve.

9. The connecting device according to claim 1, wherein the internal wall of the sleeve is designed at least partially with a conical shape.

10. The connecting device according to claim 1, wherein the external wall of the sleeve is designed at least partially with a cylindrical shape or conical shape.

11. The connecting device according to claim 1, wherein the top of the sleeve comprises a chamfer, the chamfer angle being approximately 45° with respect to the axis.

12. A thermal exchanger between at least a first fluid and a second fluid, for a motor vehicle, the thermal exchanger comprising at least one metal component with at least one opening for flowing the first fluid, wherein the exchanger further comprises at least one connecting device according to claim 1 for connecting the opening to a circuit of the first fluid.

13. The exchanger according to claim 12, wherein at least one of the female part or male part of the connecting device is integrally formed with the metal component.

14. The exchanger according to claim 13, wherein the metal component comprises at least one sleeve surrounding an associated opening and able to receive at least partially an associated male part configured to be connected to the circuit of the first fluid, with a gap defined between the sleeve and the male part for receiving a brazing material.

15. The exchanger according to claim 12, wherein the conical shape of the sleeve is directed towards an outside of the exchanger.

16. The exchanger according to claim 12, wherein the metal component includes a cover plate of the exchanger, and wherein the axis is substantially perpendicular to a plane defined by the cover plate.

* * * * *